United States Patent
Lin

(10) Patent No.: US 7,111,097 B2
(45) Date of Patent: Sep. 19, 2006

(54) ONE WIRE SERIAL COMMUNICATION PROTOCOL METHOD AND CIRCUIT

(75) Inventor: Peter Lin, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 214 days.

(21) Appl. No.: 10/249,447

(22) Filed: Apr. 10, 2003

(65) Prior Publication Data

US 2004/0049619 A1 Mar. 11, 2004

(30) Foreign Application Priority Data

Sep. 5, 2002 (TW) .............................. 91120250 A

(51) Int. Cl.
*G06F 13/42* (2006.01)
(52) U.S. Cl. ...................... 710/105; 710/106
(58) Field of Classification Search ................ 710/105, 710/106
See application file for complete search history.

(56) References Cited

U.S. PATENT DOCUMENTS

| | | | | |
|---|---|---|---|---|
| 3,566,023 A | * | 2/1971 | Smierciak | 375/240.21 |
| 4,964,141 A | * | 10/1990 | Matsushima et al. | 375/354 |
| 5,940,510 A | * | 8/1999 | Curry et al. | 705/65 |
| 6,105,013 A | * | 8/2000 | Curry et al. | 705/65 |
| 6,219,789 B1 | * | 4/2001 | Little et al. | 713/200 |
| 2002/0083232 A1 | * | 6/2002 | Dute et al. | 710/31 |

OTHER PUBLICATIONS

The I2C-Bus Specification; Version 2.1; Jan. 2000.*
Newton's Telecom Dictionary, 18th Edition, Feb. 2002: CSMA/CD.*

* cited by examiner

*Primary Examiner*—Rehana Perveen
*Assistant Examiner*—Jeremy S. Cerullo
(74) *Attorney, Agent, or Firm*—Jianq Chyun IP Office

(57) ABSTRACT

An one wire serial communication protocol method and circuit is provided. The circuit comprises an I/O port, a control machine, a control buffer and a shift register. Date can be transmitted bi-directionally by using one wire, and several different data transmission rates can be used to transmit the serial data.

9 Claims, 9 Drawing Sheets

ONE WIRE SERIAL COMMUNICATION PROTOCOL METHOD AND CIRCUIT

CROSS REFERENCE TO RELATED APPLICATIONS

This application claims the priority benefit of Taiwan application serial no. 91120250, filed on Sep. 5, 2002.

BACKGROUND OF INVENTION

1. Field of Invention

The present invention generally relates to a serial data communication protocol method and circuit, and more particularly, to a communication protocol method and circuit for bi-directional serial data communication with one wire.

2. Description of Related Art

Data communication method is categorized as serial data communication and parallel data communication. The serial data communication includes the techniques of I$^2$C bus, UART (Universal Asynchronous Receiver Transmitter) and HDQ16 protocol, etc.

FIG. 1 schematically shows a configuration diagram of a conventional I$^2$C bus. As shown in FIG. 1, each device on I$^2$C bus uses SDA (Serial Data Line) 102 and SCL (Serial Clock Line) 104 to transmit data. Data is transmitted uni-directionally with a format of 8 bits serial type on I$^2$C bus. Data also can be transmitted on I$^2$C bus di-directionally, and the standard data transmission rate is 100 kbit/s, although it can be improved to transfer data with a rate of 400 kbit/s.

Transmitting data on the I$^2$C bus is widely accepted currently. FIG. 2, that schematically shows a data transmitting timing diagram of the I$^2$C bus, is used for brief description hereinafter. It is assumed that the Micro-Controller A 106 in FIG. 1 intends to transmit data to the Micro-Controller B 108, and the Micro-Controller A 106 prepares sending data to SDA 102 in interval I of FIG. 2. However, since SCL 104 is in a low level state, the Micro-Controller B 108 will not receive any data from SDA 102. SCL 104 is in a high level state in interval II, in which the Micro-Controller B 108 receives data sent out from Micro-Controller A 106 on SDA 102. Then, SCL 104 turns back to the low level state again in interval III, in which the Micro-Controller B 108 does not receive any data from SDA 102, and the Micro-Controller A releases the usage right of the SDA 102 and the SCL 104.

FIG. 3 schematically shows a block diagram of a conventional UART configuration. FIG. 3 is a partial structure of a whole computer system, and the chip number 8251 (made by Intel is used as the configuration of the UART communication. When the computer intends to sen data to an external peripheral device (not shown), before the transmit buffer 302 sends seri data to the external peripheral device (not shown), the transmit controller 304 performs a confirmation operation with the external peripheral device (not shown) via the TXRDY, TXE, and $\overline{\text{TXC}}$ signal lines, so as to confirm whether the external peripheral device (not shown) is ready to receive data or not. Once the external peripheral device (not shown) is ready to receive data the serial data is sent to the external peripheral device (not shown) via the transmission line TXD of the transmit buffer 302, so that the computer can complete the operation of sending data to the external peripheral device (not shown).

Similarly, when the computer intends to receive data from an external peripheral device (not shown), before the receive buffer 306 receives serial data from the external peripheral device (not shown), the receive controller 308 performs a confirmation operation with the external peripheral device (not shown) via the RXRDY, SYNDET/DB, and $\overline{\text{RXC}}$ signal lines, so as to confirm whether the external peripheral device (not shown) is ready to send data or not. Once the external peripheral device (not shown) is ready to send data, the serial data is received from the external peripheral device (not shown) via the transmission line RXD of the receive buffer 306, so that the computer can complete the operation of receiving data from the external peripheral device (not shown).

FIG. 4A schematically shows a transmitting timing diagram of a conventional UART configuration. As shown in FIG. 4A, when the computer intends to send data to the external peripheral device, the TXE signal line is in a low level state, and the serial data DATA CHAR1, DATA CHAR2 and DATA CHAR3 are sent to the external peripheral device via the transmission line TXD. While when the TXE signal line is in a high level state, the transmission line TXD stops transmitting the serial data.

Similarly, as shown in FIG. 4, which schematically shows a receiving timing diagram of a conventional UART configuration, whether the computer intends to receive data from the external peripheral device or not is determined based on the status of the BD and RXRDY, and the serial data DATA CHAR1, DATA CHAR2 and DATA CHAR3 are received from the external peripheral device via the receiving line RXD.

In summary, if I$^2$C bus serial communication method having a standard data transmission rate 100 kbit/s and a high speed data transmission rate 400 kbit/s is used to transmit data, it takes a long transmission time for transmitting the great amount of data that is needed for the current environment. Besides, The I$^2$C bus needs two data transmission lines to perform the bi-directional data transmission, which makes it a complicated configuration. If the UART serial communication method is used to perform the bi-directional data transmission, two data lines are still needed and the circuit designed by using UART as the communication configuration is also quite complicated.

SUMMARY OF INVENTION

To solve above problems, a one wire serial communication protocol method and circuit is provided by the present invention. With it, data can be transmitted bi-directionally with a high speed transmission rate by using only one data transmission line so as to greatly save the transmission time. Besides, a circuit with a simple configuration can be designed under such configuration.

A one wire serial communication protocol circuit is provided by the present invention. The one wire serial communication protocol circuit comprises an I/O port (Input/Output port), used to send or receive data; a control machine, coupled to the I/O port, used to control whether the one wire serial communication protocol circuit is in a sending data state or in a receiving data state; a control buffer, coupled to the I/O port and the control machine, used to transmit a serial data sent from the control machine to the I/O port; and a shift register, coupled to the control machine, used to convert a parallel data into a serial data and send the converted serial data to the control machine, and also convert a serial data sent from the control machine into a parallel data and send the converted parallel data to an upper layer control circuit.

The one wire serial communication protocol method provided by the present invention comprises the steps of: first, maintaining itself in a state of receiving data for receiving serial data; then, before the serial data is sent, the state of receiving data is turned to a state of sending data for sending a data signal that is intended to be transmitted; then sending the serial data; and after the sending data is completed, the state of sending data is turned back to the state of receiving data. Therefore, one wire can perform the bidirectional data transmission.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a configuration diagram of a conventional $I^2C$ bus.

DETAILED DESCRIPTION

Figure 1:
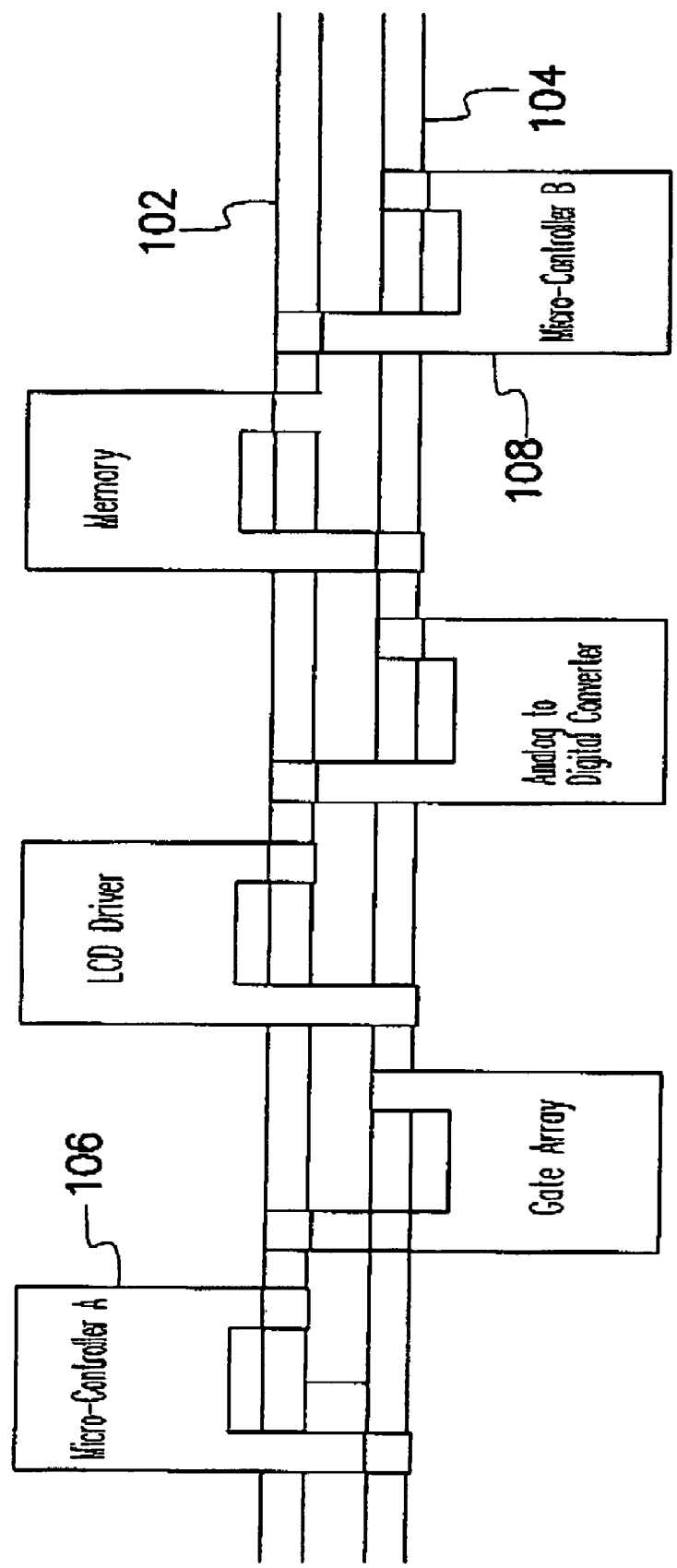
Figure 2:
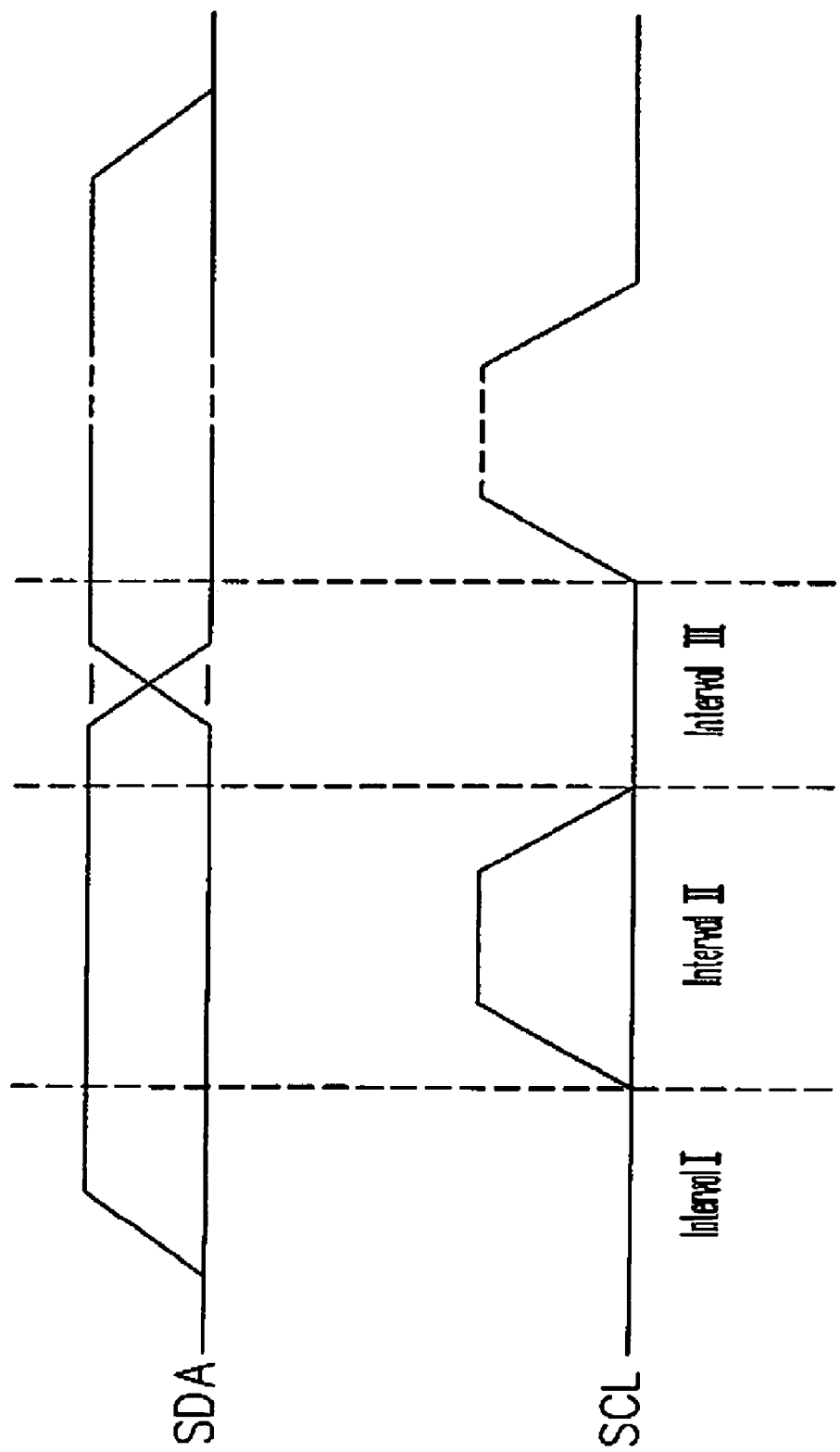
FIG. 2 schematically shows a data transmitting timing diagram of a conventional $I^2C$ bus.
Figure 3:
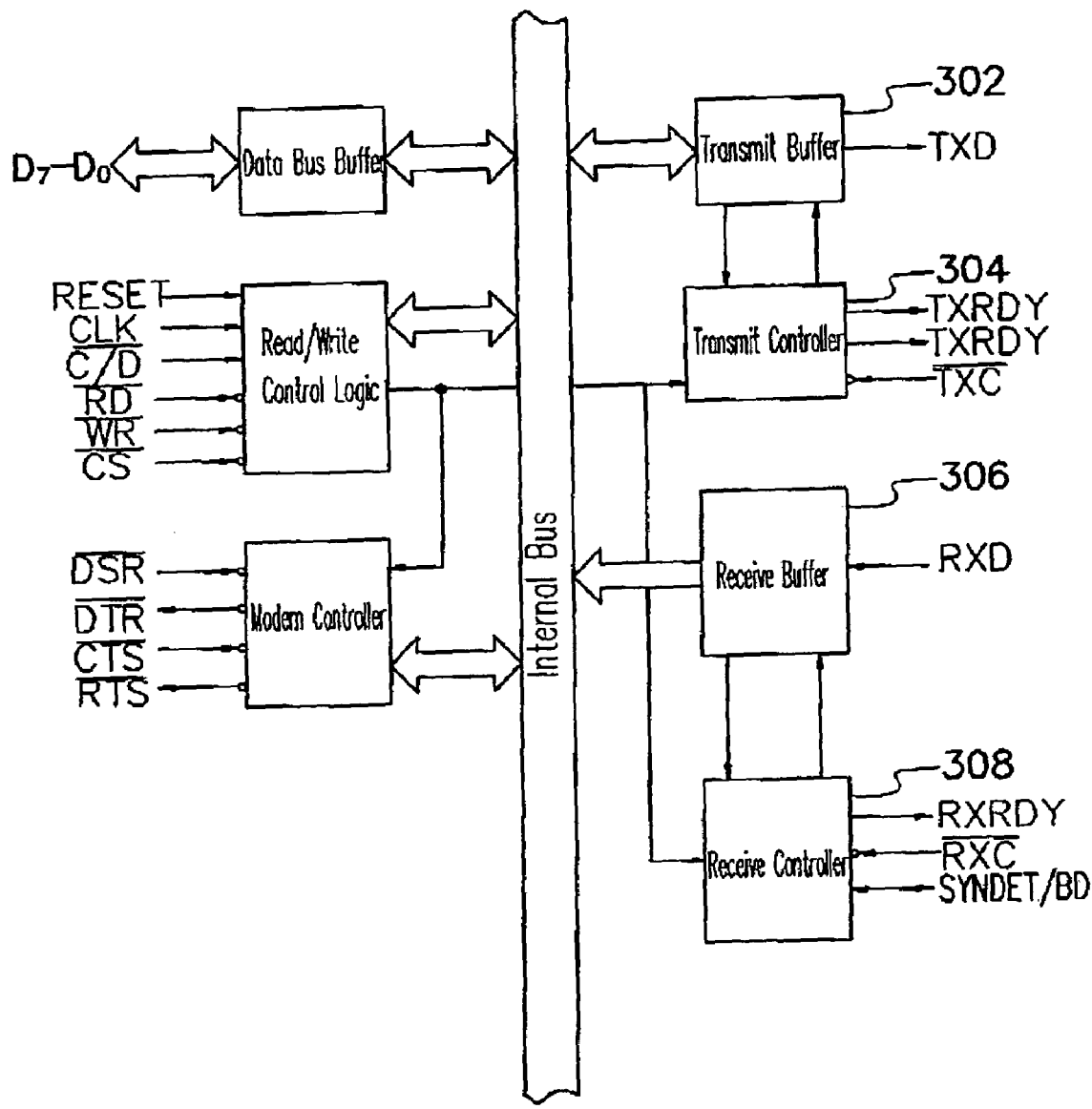
FIG. 3 schematically shows a block diagram of a conventional UART configuration.
Figure 4A:
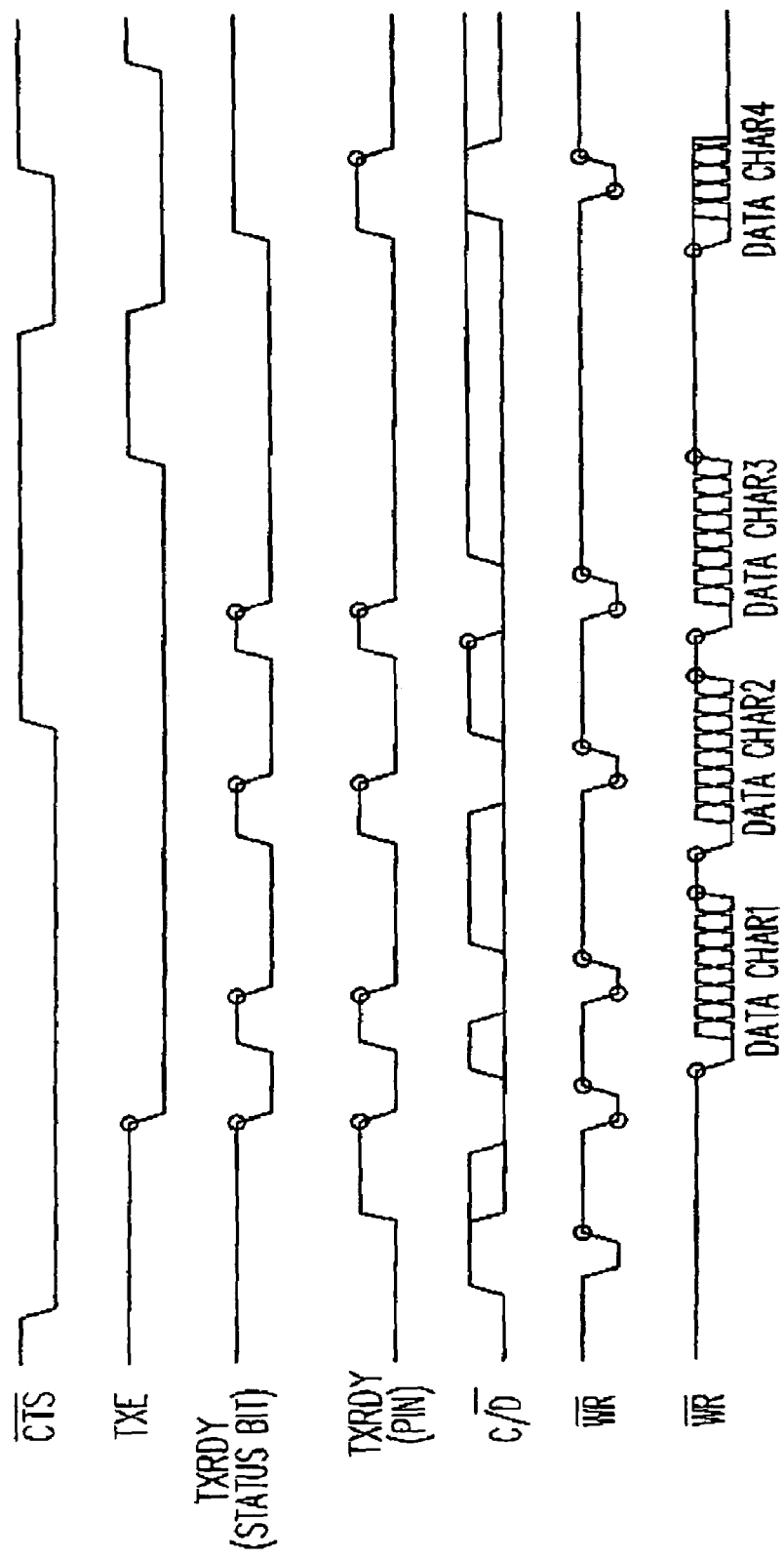
FIG. 4A schematically shows a transmitting timing diagram of a conventional UART configuration.
Figure 4B:
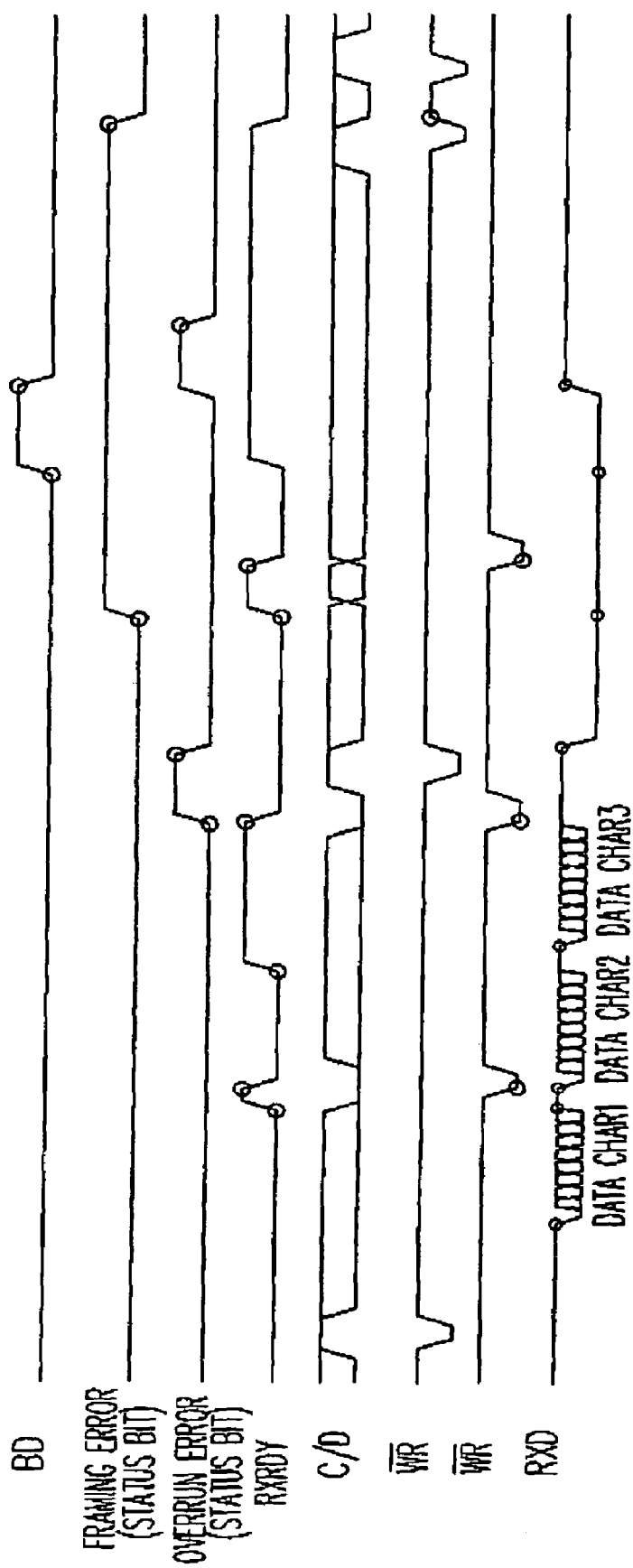
FIG. 4B schematically shows a receiving timing diagram of a conventional UART configuration.
Figure 5:
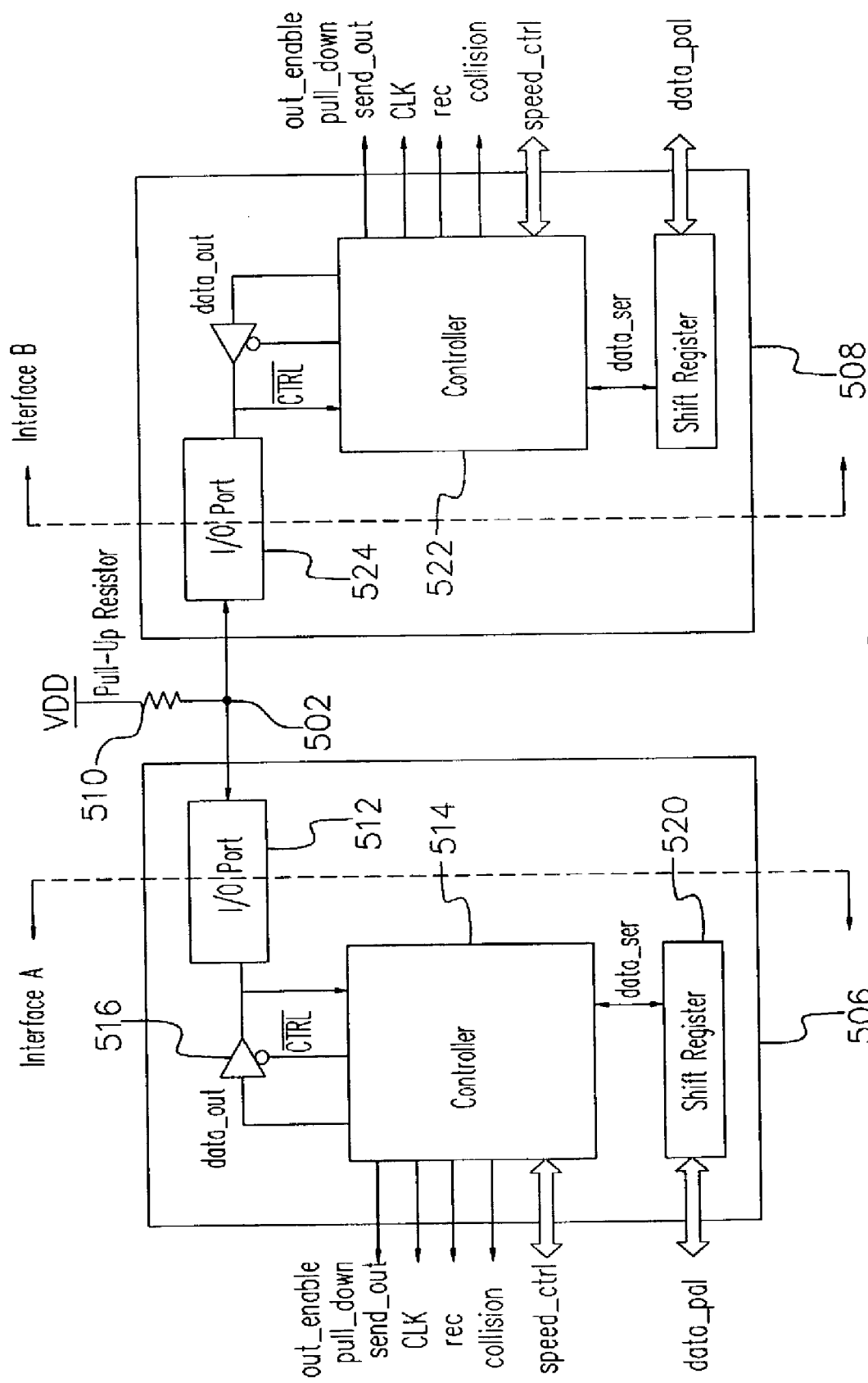
FIG. 5 schematically shows a block diagram of a one wire serial communication protocol circuit according to the present invention.

FIG. 5 schematically shows a block diagram of an one wire serial communication protocol circuit according to the present invention. As shown in FIG. 5, several one wire serial communication protocol circuits with different interfaces, e.g. the one wire serial communication protocol circuit 506 with interface A and the one wire serial communication protocol circuit 508 with interface B, are coupled to data transmission line 502 in parallel. For easily describing its circuit operation, two one wire serial communication protocol circuits (the one wire serial communication protocol circuit 506 and the one wire serial communication protocol circuit 508 as shown in FIG. 5, wherein the one wire serial communication protocol circuit 506 has the same circuit structure as the one wire serial communication protocol circuit 508) are exemplified in the present embodiment. The one wire serial communication protocol circuit 506 and the one wire serial communication protocol circuit 508 are coupled to the pull-up resistor 510, respectively, and the other electrode of the pull-up resistor 510 is coupled to a voltage source VDD.

The one wire serial communication protocol circuit 506 comprises an I/O port 512, a control machine 514, a control buffer 516, and a shift register 520. The I/O port 512 is coupled to one electrode of a pull-up resistor 510 for sending or receiving data. The control machine 514 is coupled to the I/O port 512 for controlling whether the one wire serial communication protocol circuit 506 is in a state of sending data or in a state of receiving data. The control buffer 516 is coupled to the I/O port 512 and the control machine 514 for sending a serial data data-out sent from the control machine 514 to the I/O port 512. The shift register 520 is coupled to the control machine 520 for converting a parallel data data_pal (with a data format of 8 bits or more than 8 bits) sent from an upper layer control circuit into a serial data data_ser (with a data format of 1 bit) and sending the converted serial data to the control machine 514. Besides, it also converts a serial data data_ser sent from the control machine 514 into a parallel data data_pal and subsequently sends it out.

Figure 6:
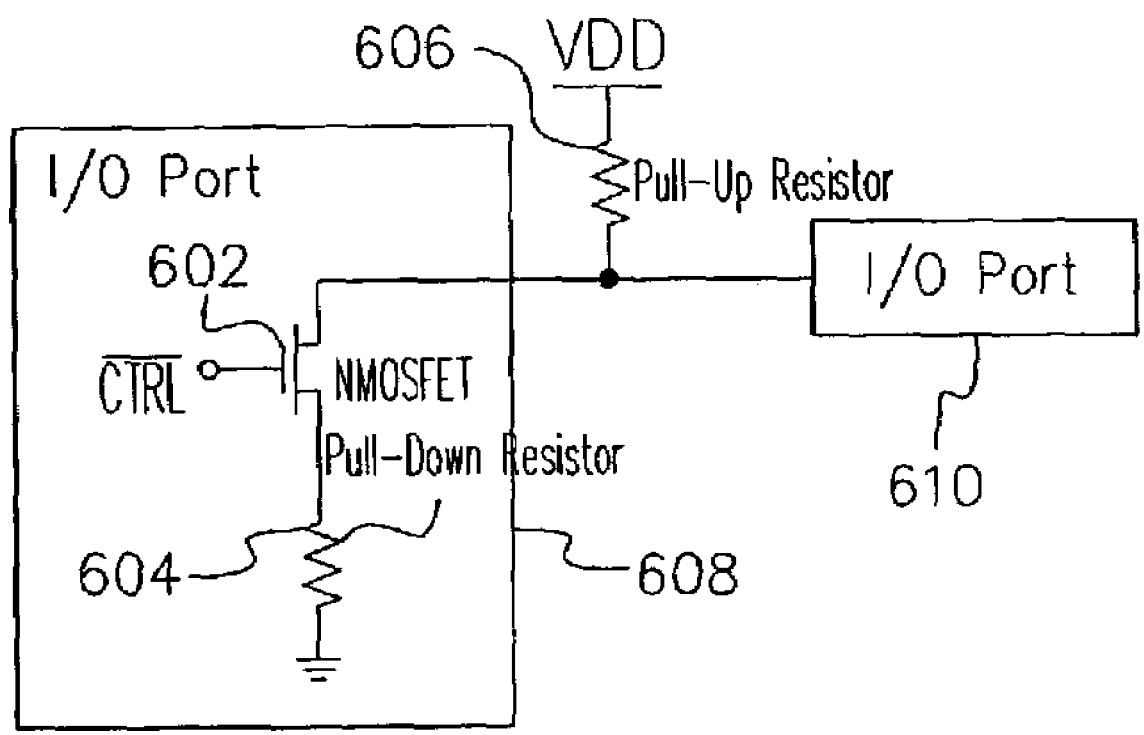
FIG. 6 schematically shows a partial circuit diagram of an I/O port according to the present invention.
Figure 7:
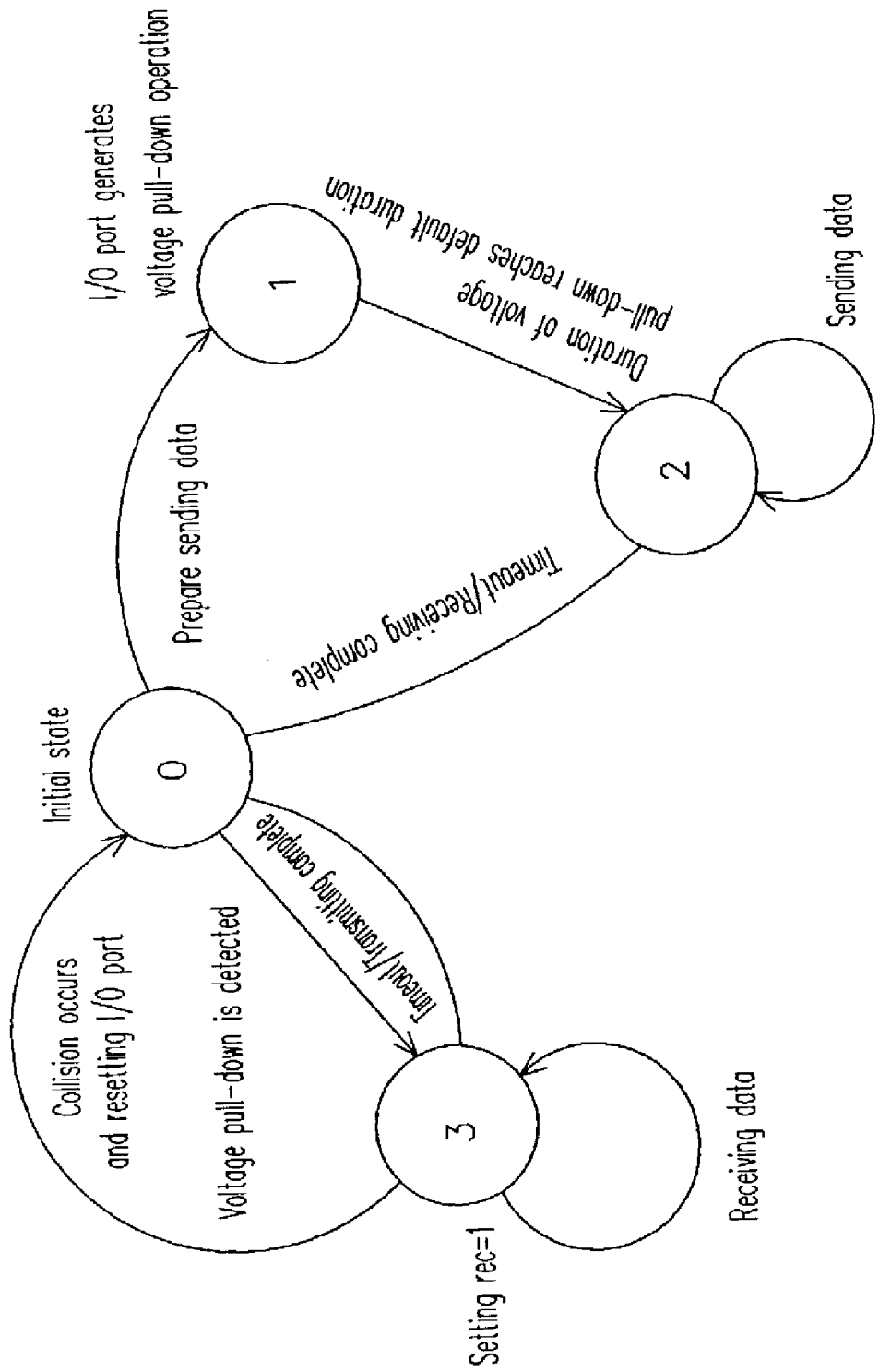
FIG. 7 schematically shows a state diagram of the one wire serial communication protocol method according to the present invention.

The partial circuit of the I/O port 512 inside the one wire serial communication protocol circuit 506 is as shown in FIG. 6, which schematically shows a partial circuit diagram of an I/O port according to the present invention. A drain of the NMOSFET 602 (other type of transistor also can be used) in the I/O port 608 is coupled to one electrode of a pull-up resistor 606 (the pull-up resistor 606 is 10 K Ω and the voltage source VDD is 5V in the present embodiment), and a gate of the NMOSFET 602 receives a pull-down control signal CTRL sent from the control machine (not shown). One electrode of the pull-down resistor 604 (the pull-down resistor 604 is 10KΩ) is coupled to a source of the NMOSFET 602, and the other electrode of the pull-down resistor 604 is grounded. The I/O port 610 has the same circuit structure as the I/O port 608.

As shown in FIG. 6, the one wire serial communication protocol circuit (not shown) normally stays in a state of receiving data, in which the pull-down control signal CTRL sent from the control machine (not shown) deactivates the NMOSFET 602, and the voltage on the drain of the NMOSFET 602 is 5V. If the state of the one wire serial communication protocol circuit (not shown) turns from receiving data to a state of sending data, the pull-down control signal CTRL sent from the control machine (not shown) activates the NMOSFET 602, and the voltage on the drain of the NMOSFET 602 is 2.5V caused by a result of voltage divided by the pull-up resistor 606 and the pull-down resistor 604. Besides, the voltage on the drain of the NMOSFET (not shown) inside the I/O port 610 is also 2.5V. If the one wire serial communication protocol circuit 506 and the one wire serial communication protocol circuit 508 (as shown in FIG. 5) turn the state of receiving data to a state of sending data simultaneously, the NMOSFET 602 inside the I/O port 608 and the NMOSFET (not shown) of the I/O port 608 are activated simultaneously. The voltage on the drain of the NMOSFET 602 falls down to 1.6V caused by a result of voltage divided by the pull-up resistor 606, the pull-down resistor 604 of the I/O port 608 and the pull-down resistor (not shown) of the I/O port 610. When the voltage of the drain of the NMOSFET 602 falls down to 1.6V, it indicates a collision has happened in the one wire serial communication protocol circuit (not shown).

STATE 1: The control machine 514 controls the I/O port 512 for performing a voltage pull-down operation (i.e. pulling down the voltage of the data transmission line 502 to 2.5V, which is substantially referred as generating an indicating signal for indicating that data is to be transmitted). Moreover, as shown in table 1, a duration of the voltage pull-down (or the duration of indicating signal) is used to select a variety of data transmission rates. The one wire serial communication protocol circuit 506 turns the state of receiving data to a state of sending data, in which the control machine 522 detects the voltage of the data transmission line 502 has been pulled down, and the one wire serial communication protocol circuit 508 maintains itself in its original state (the state of receiving data). The one wire serial communication protocol circuit 508 waits for the one wire serial communication protocol circuit 506 to send data. The duration of the pull-down voltage of the one wire serial communication protocol circuit 506 is kept as a length of two clocks (two clocks (20 μs) is exemplified in the present embodiment). A default low speed transmission rate (100 KHz) is prepared for transmitting data, and the control machine 514 subsequently enters into state 2.

STATE 0: The control machine 514 is in an initial state, when the one wire serial communication protocol circuit 506 prepares sending data to the one wire serial communication protocol circuit 508, the upper layer control circuit (not shown) sends the output-enable, pull-down and send-out signals to the control machine 514, and the control machine 514 also enters into state 1; when the control machine 514 detects the voltage of the data transmission line 502 has been pulled down, the control machine 514 enters into state 3.

STATE 1: The control machine 514 controls the I/O port 512 for performing a voltage pull-down operation (i.e. pulling down the voltage of the data transmission line 502 to 2.5V). The one wire serial communication protocol circuit 506 turns the state of receiving data to a state of sending data, in which the control machine 522 detects the voltage of the data transmission line 502 has been pulled down, and the one wire serial communication protocol circuit 508 maintains itself in its original state (the state of receiving data). The one wire serial communication protocol circuit 508 waits for the one wire serial communication protocol circuit 506 to send data. The duration of the pull down voltage of the one wire serial communication protocol circuit 506 is kept as a length of two clocks (two clocks (20 μs) is exemplified in the present embodiment). A default low speed transmission rate (100 KHz) is prepared for transmitting data, and the control machine 514 subsequently enters into state 2.

STATE 2: the upper layer control circuit (not shown) sends a parallel data data_pal to the shift register 520. Then, the shift register 520 converts the parallel data data_pal into a serial data data_ser. The transmission rate of the serial data data_ser is determined based on the clock signal CLK sent from the upper layer control circuit (not shown) to the control machine 514. The serial data data_ser is sent to the one wire serial communication protocol circuit 508 via the control machine 514, the control buffer 516, the I/O port 512, and the data transmission line 502. Meanwhile, the one wire serial communication protocol circuit 506 continuously sends data to the one wire serial communication protocol circuit 508 until the data transmission is completed or a transmission timeout is occurred, then the control machine 514 returns back to state 0. Moreover, the one wire serial communication protocol circuit 508 is operated under a situation of state 3. After the one wire serial communication protocol circuit 508 receives the serial data data_ser sent from the one wire serial communication protocol circuit 506, the serial data data_ser is converted into a parallel data data_pal.

STATE 3: The one wire serial communication protocol circuit is maintained in a state of receiving data. The control machine 514 sends a signal rec=1 to the upper layer control circuit (not shown). The shift register 520 receives the serial data data_ser sent from the one wire serial communication protocol circuit 508 via the control machine 514, the control buffer 516, the I/O port 512, and the data transmission line 502. After the shift register 520 converts the serial data data_ser into a parallel data data_pal, the converted parallel data is continuously sent back to the upper layer control circuit (not shown) until the receiving data is completed or a receiving timeout occurs. Then, control machine 514 sends a signal rec=0 to the upper layer control circuit (not shown), and the one wire serial communication protocol circuit subsequently turns back to state 0. Since the transmitting serial data data_ser is completed, the one wire serial communication protocol circuit 508 also turns back to state 0. If the one wire serial communication protocol circuit 508 intends to transmit data to the data transmission line 502 and the one wire serial communication protocol circuit 506 also intends to transmit data to the data transmission line 502 at the same time, a collision occurs accordingly (i.e. the voltage of the data transmission line 502 has been pulled down to 1.6V), in which the I/O port 512 generates an initial/reset signal and sends it to the control machine 514, and the control machine 514 sends a collision signal to the upper layer control circuit (not shown). Besides, the one wire serial communication protocol circuit 506 turns its state of sending data to a state of receiving data, and the control machine 514 subsequently turns back to state 0.

Figure 8:
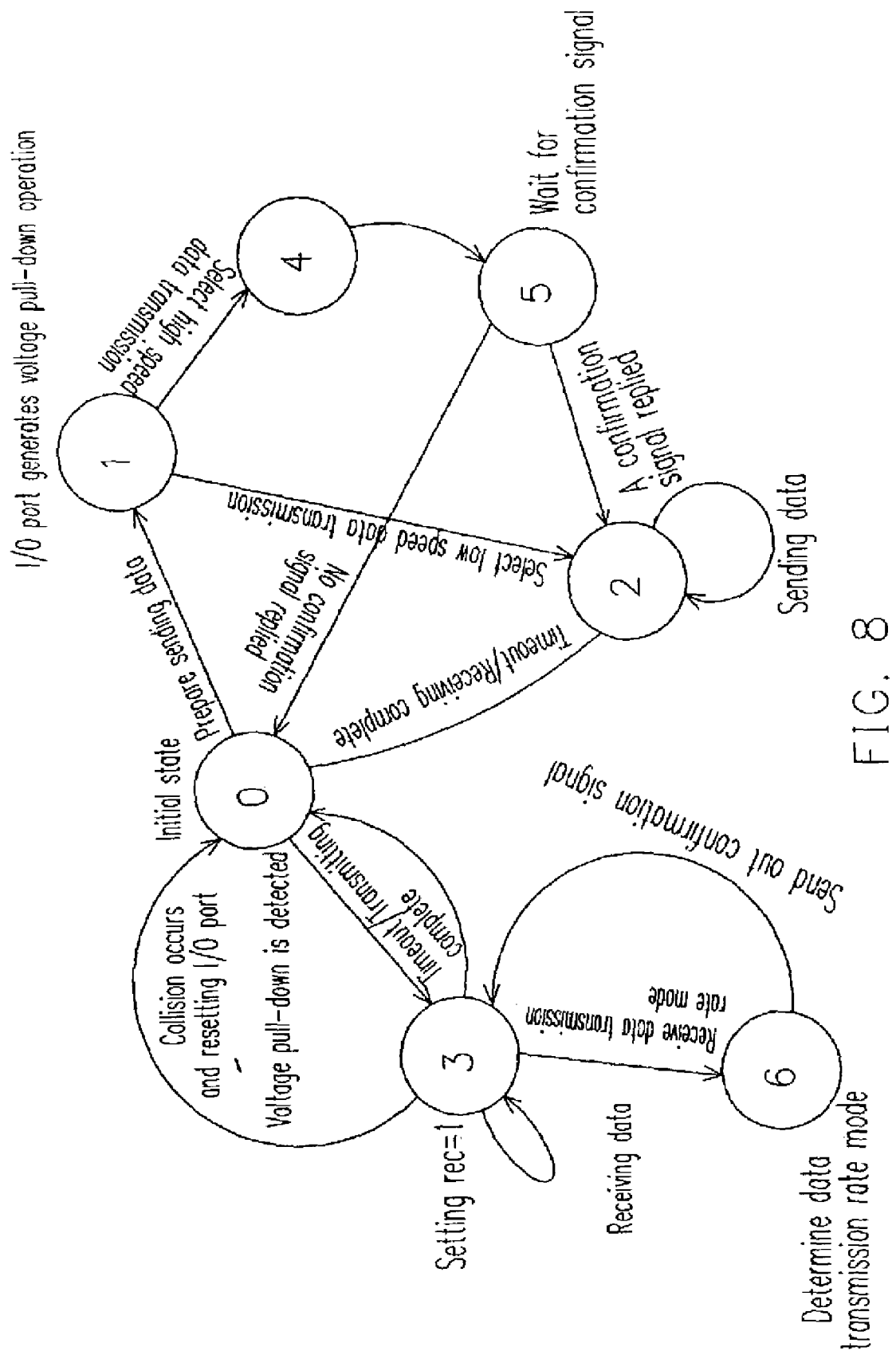
FIG. 8 schematically shows a state diagram for the one wire serial communication protocol method according to the present invention when it is operated under a high speed mode; and Table 1 shows a comparison table for various transmission rate.

FIG. 8 schematically shows a state diagram for the one wire serial communication protocol method according to the present invention when it is operated under a high speed mode. The states of the one wire serial communication protocol circuit 506 in FIG. 5 are also referred to for describing that the one wire serial communication protocol circuit 506 not only transmits data under a low speed data transmission rate, but data also can be transmitted under various high speed data transmission rates as indicated in a comparison table of various data transmission rates in Table 1. When the duration of voltage pull down is 2 clocks, it indicates that the data is transmitted with a default low speed (or referred to "the first") data transmission rate as 100K Hz clock. When the duration of voltage pull down is 4 clocks, it indicates that the data is transmitted with a high speed (or referred to "the second") data transmission rate as 200K Hz clock, wherein the second data transmission rate is higher than the first data data transmission rate. All other conditions are as shown in the table.

STATE 0: The one wire serial communication protocol circuit 506 is in an initial state. When the one wire serial communication protocol circuit 506 prepares sending data to the one wire serial communication protocol circuit 508, the upper layer control circuit (not shown) sends the output_enable, pull_down and send_out signals to the control machine 154, and the control machine 514 enters into state 1. When the control machine 514 detects that the voltage of the data transmission line 502 has been pulled down, the control machine 514 enters into state 3.

STATE 1: The control machine 514 controls the I/O port 512 for performing a voltage pull-down operation. The one wire serial communication protocol circuit 506 turns the state of receiving data to a state of sending data, in which the control machine 522 detects the voltage of the data transmission line 502 has been pulled down, and the one wire serial communication protocol circuit 508 maintains itself in its original state (the state of receiving data). The one wire serial communication protocol circuit 508 waits for the one wire serial communication protocol circuit 506 sending data. When the low speed data transmission rate is selected to transmit data or the data is transmitted with a speed changed from the high speed data transmission mode to the low speed data transmission mode, the control machine 514 pulls down the voltage of the data transmission line 504 for a duration of several clocks, so that the one wire serial communication protocol circuit 508 can recognize the data transmission rate used for high speed data transmission. When the high speed data transmission rate is used to transmit data or the data transmission line 502 is already in high speed data transmission mode, the control machine 514 enters into state 4.

STATE 2: the upper layer control circuit (not shown) sends a parallel data data_pal to the shift register 520. Then, the shift register 520 converts the parallel data data_pal into a serial data data_ser. The transmission rate of the serial data data_ser is determined based on the clock signal CLK sent from the upper layer control circuit (not shown) to the control machine 514. The serial data data_ser is sent to the one wire serial communication protocol circuit 508 via the control machine 514, the control buffer 516, the I/O port 512, and the data transmission line 502. Meanwhile, the one wire serial communication protocol circuit 506 continuously sends data to the one wire serial communication protocol circuit 508 until the data transmission is completed or a transmission timeout occurs, then the control machine 514 returns back to state 0.

STATE 3: The one wire serial communication protocol circuit is maintained in a state of receiving data. The control machine 514 sends a signal rec=1 to the upper layer control circuit (not shown). The shift register 520 receives the serial data data_ser sent from the one wire serial communication protocol circuit 508 via the control machine 514, the control buffer 516, the I/O port 512, and the data transmission line 502. After the shift register 520 converts the serial data data_ser into a parallel data data_pal, the converted parallel data is continuously sent back to the upper layer control circuit (not shown) until the receiving data is completed or a receiving timeout is occurred. Then, control machine 514 sends a signal rec=0 to the upper layer control circuit (not shown), and the control machine 514 subsequently turns back to state 0. If the one wire serial communication protocol circuit 508 intends to transmit data to the data transmission line 502 and the one wire serial communication protocol circuit 506 also intends to transmit data to the data transmission line 502 at the same time, a collision occurs accordingly, in which the I/O port 512 generates an initial/reset signal and sends it to the control machine 514, and the control machine 514 sends a collision signal to the upper layer control circuit (not shown). Besides, the one wire serial communication protocol circuit 506 turns its state of sending data to a state of receiving data, and the control machine 514 subsequently turns back to state 0. When the machine control 514 detects the duration of voltage pull down is over 2 clocks, it indicates that the one wire serial communication protocol circuit 508 intends to transmit data with a high speed data transmission rate, thus the control machine 514 enters into state 6 to determine which speed is used for transmitting data and replies with it (meanwhile, the one wire serial communication protocol circuit 508 is in state 5).

STATE 4: The upper layer control circuit (not shown) sends a transmission speed signal speed_ctrl to the control machine 514 so as to determine which high speed data transmission rate is used to transmit data by the one wire serial communication protocol circuit 506. The control machine 514 makes the duration needed for pulling down voltage of the data transmission line 502 correspond to the selected high speed data transmission rate (as shown in Table 1), and the control machine subsequently enters into state 5.

STATE 5: The control machine 514 maintains the data transmission line 502 in its original voltage (i.e. the voltage of the data transmission line 502 is 5V). The one wire serial communication protocol circuit 506 turns the state of sending data to a state of receiving data, and waits for a confirmation signal sent from the one wire serial communication protocol circuit 508. The signal is used to pull down the voltage of the data transmission line 502 for duration of one clock by the one wire serial communication protocol circuit 508. When there is no confirmation signal sent from the one wire serial communication protocol circuit 508 to reply to the one wire serial communication protocol circuit 506, it indicates the one wire serial communication protocol circuit 508 does not support high speed data transmission mode, and only the low speed data transmission mode can be used to transmit data. In such case, the control machine 514 notifies the upper layer control circuit (not shown) that it can be only operated with a low speed data transmission mode, and the control machine 514 returns back to state 0. When there is a confirmation signal sent from the one wire serial communication protocol circuit 508 to reply to the one wire serial communication protocol circuit 506, it indicates the one wire serial communication protocol circuit 508 supports high speed data transmission mode, thus the high speed data transmission mode can be used to transmit data and the control machine 514 subsequently enters into state 2.

STATE 6: The control machine 514 sends a transmission signal speed_ctrl to the upper layer control circuit (not shown) according to the duration of voltage pull down on the data transmission line 502. When the upper layer control circuit (not shown) determines that the one wire serial communication protocol circuit 508 does not support high speed data transmission rate as requested, the one wire serial communication protocol circuit 506 will not reply with the confirmation signal to the one wire serial communication protocol circuit 508. When the upper layer control circuit (not shown) determines that the one wire serial communication protocol circuit 508 supports high speed data transmission rate as requested, the one wire serial communication protocol circuit 506 will reply with a confirmation signal to the one wire serial communication protocol circuit 508, and the control machine 514 subsequently enters into state 3.

The method provided by the present invention hides the command and signal handshake in the clock period, therefore if only the low speed is used to transmit data, the one wire serial communication protocol circuit is quite simple. When the high speed transmission device cooperates with the low speed transmission device, its data transmission rate is compatible with the low speed data transmission rate. If it is used in the high speed data transmission, the one wire serial communication protocol circuit can be integrated with the upper layer control circuit, and the block transfer can be used for the data that is to be transmitted or a CRC error detection circuit can be added.

The circuit of the present invention may further comprise a collision detection function. The control buffer in the one wire serial communication protocol circuit can be used to determine whether collision has occurred or not. If the control buffer also receives a voltage pull down at the same time the control buffer sends out the data, it indicates a collision has occurred.

Therefore, the advantage of the present invention is that it can perform the bi-directional data transmission function with only one transmission line.

The other advantage of the present invention is that data is not only transmitted with a low speed data transmission rate, but also can be operated with a higher data transmission rate (e.g. 1 MHz clock). Besides, different speeds of high speed data transmission rate can be selected according to the data transmission rate required by different interfaces so as to save the transmission time for transmitting a great amount of data.

A further advantage is that the transmission protocol method and circuit provided by the present invention is quite simple, without having to consider the complicated relationship of the sending and receiving data.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

TABLE 1

| Voltage pull-down time | Transmission role |
| --- | --- |
| 2clock | Low speed (default mode 100 KHz clock) |
| 4colck | 200 KHz colck |
| 5clock | 500 KHz clock |
| 6clock | 1 MHZ CLOCK |
| 7clock | With the speed of 500 KHz unit, and adapts to data that is to be transmitted subseque |
| 8clock | Reset to make initial mode as low speed mode |

The invention claimed is:

1. An one wire serial communication protocol circuit, comprising:
   an I/O port, used to receive and send data;
   a control machine, coupled to the I/O port, used to control whether the one wire serial communication protocol circuit is in a state of sending data or in a state of receiving data, wherein the control machine is able to generate an indicating signal for selecting the data transmitted either in a first speed data transmission mode or a second speed data transmission mode;
   a control buffer, coupled to the I/O port and the control machine, used to transmit a serial data sent from the control machine to the I/O port; and
   a shift register, coupled to the control machine, used to convert a parallel data into a serial data and send the converted serial data to the control machine, and used to convert the serial data sent from die control machine to a parallel data and send out the converted parallel data.

2. The one wire serial communication protocol circuit of claim 1, wherein the one wire serial communication protocol circuit is coupled to an electrode of a pull-up resistor, and the other electrode of the pull-up resistor is coupled to a voltage source.

3. The one wire serial communication protocol circuit of claim 2, wherein the I/O port further comprises:
   a transistor, having a power electrode, a loading electrode and a control electrode, wherein the power electrode is coupled to an electrode of the pull-up resistor, and the control electrode receives a pull-down control signal sent from the control machine; and
   a pull-down resistor, wherein an electrode of the pull-down resistor is coupled to the loading electrode, and the other electrode of the pull-down resistor is grounded.

4. The one wire serial communication protocol circuit of claim 3, wherein the transistor is a NMOSFET.

5. A one wire serial communication protocol method, comprising:
   maintaining in a state of receiving data for receiving a serial data to be received;
   before sending a serial data, turning the state of receiving data to a state of sending data, and generating an indicating signal for indicating that the serial data is to be transmitted;
   sending out the serial data; and
   after sending out the serial data, turning the state of sending data to the state of receiving data, wherein the step of sending out the serial data is operated under either a first speed data transmission mode or a second speed data transmission mode, and the indicating signal is used to select data transmission made either in the first speed data transmission mode or in the second speed data transmission mode.

6. The one wire serial communication protocol method of claim 5, wherein the step of sending out the serial data is performing at a voltage pull down operation.

7. The one wire serial communication protocol method of claim 5, wherein the serial data is convened from a parallel data.

8. The one wire serial communication protocol method of claim 5, wherein in the step of sending out the serial data, the second speed data transmission mode has several different transmission rates to transmit the serial data and the second data transmission rate is higher than the first data transmission rate.

9. The one wire serial communication protocol method of claim 8, wherein if a confirmation signal is received after a certain duration when the indicating signal is sent out, data transmission mode is operated in the second speed data transmission mode, otherwise, data transmission mode is operated in the first speed data transmission mode.

* * * * *